July 4, 1961 RIHEI OHMI 2,990,609
CASTING MADE OF ALUMINUM OR ALUMINUM ALLOY
Filed March 11, 1958

INVENTOR
RIHEI OHMI
BY
ATTORNEY

United States Patent Office 2,990,609
Patented July 4, 1961

2,990,609
CASTING MADE OF ALUMINUM OR ALUMINUM ALLOY
Rihei Ohmi, No. 191 1-Chome Shinden-cho, Ichikawa City, Japan
Filed Mar. 11, 1958, Ser. No. 720,748
1 Claim. (Cl. 29—492)

The present invention relates to castings made of aluminum or aluminum alloy.

This invention is characterized by fusing together different parts of castings made of aluminum or aluminum alloy into one body by applying a special alloy (soft solder) on the required surfaces to be joined in accordance with the method set forth herein.

Heretofore, a casting of aluminum or aluminum alloy had to be made as one body even in the case of a complex construction owing to the difficulty of joining the parts together by the soft soldering or welding. Therefore, a workpiece has been impossible to divide into several parts and cast each part separately. By this invention it has now been discovered that the perfect soldering of aluminum or aluminum alloy is possible.

It is an object of the present invention to provide means of soldering perfectly aluminum or aluminum alloy by means of a soldering alloy, the chief ingredients of which are Al, Cu and Zn. It is a further object of the present invention to provide means of casting separately each part of a complex construction of aluminum or aluminum alloy and of joining the parts together of them by means of the above-mentioned soldering alloy.

Another object of the present invention is to provide means of manufacturing casting of a high tensile strength by a special process whereby the above-mentioned soldering alloy is melted and coated on the aluminum or aluminum alloy surfaces to be joined, the latter being heated together. On the other hand, a new melted soldering alloy is poured into the joint and this is allowed to cool.

This invention also contemplates providing means of preventing overflow of the soldering alloy on the outer circumference of the joined surfaces, so as to easily form an alumite coating of the casting made of aluminum or aluminum alloy.

The invention further contemplates providing means of making the soldering operation easy and at the same time reenforcing the soldering strength by a special shape or construction of the joined surfaces.

Other objects and advantages will become apparent from the following description of the invention.

For the purpose of illustrating the invention, there are shown in the accompanying drawings a form which is at present preferred, although it will be understood that the instrumentalities of which the invention consists may be variously arranged and organized and that the invention is not limited to the specific arrangement and organization of the instrumentalities as herein shown and described.

Generally speaking, the present invention contemplates coating each part of the aluminum or aluminum alloy casting separately made, that is the surfaces to be joined, with melted soldering alloy (soft solder) and to pour again said soldering alloy (soft solder) to the joint in order to join them completely.

It is essential that the above soldering alloy be composed of 4–4.3% Al, 4.8–5% Cu and the remainder Zn. Moreover, it is desirable that the impurities contained in it to be below 0.06%.

Figure 1:
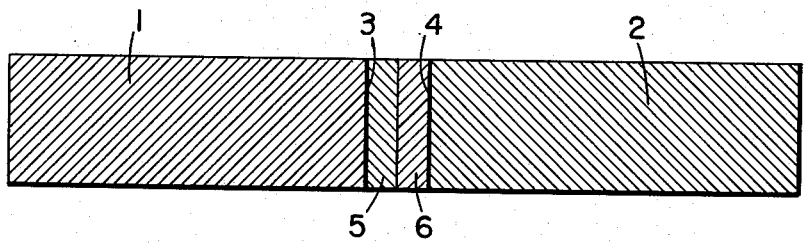
FIG. 1 is a side sectional view of an illustrative embodiment in accordance with the invention.

The construction of this invention is details:

FIG. 1 shows two parts of the aluminum or aluminum alloy casting separately made, the surfaces to be joined are coated with melted soldering alloy (soft solder) composed of Al, Cu and Zn and these are put together side by side.

In the drawing, 1 and 2 are two parts of the aluminum or aluminum alloy casting, 3 and 4 show two surfaces of said parts; 5 and 6 show said soldering alloy (soft solder) coated on the surfaces 3 and 4 respectively. In the state given in the drawing, the parts to be joined 1 and 2 are heated and the melted soldering alloy is again poured in the joint and this is allowed to cool, then soldering of both parts 1 and 2 is completed.

As mentioned above, the section soldering of aluminum or aluminum alloy, which was considered heretofore impossible has now been made possible by this invention. Therefore, it is now made possible to cast separately each part of a workpiece and by soldering together these parts, a complete workpiece can be obtained.

Figure 2:
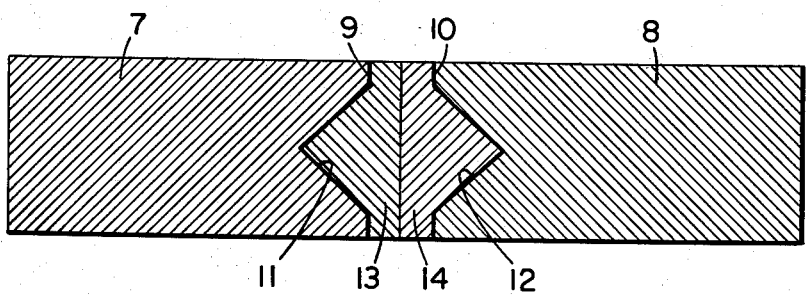
FIG. 2 depicts a side sectional view illustrating another embodiment in accordance with the invention.

For the purpose of giving those skilled in the art a better understanding of invention, the following illustrative example is given:

In FIG. 2, 7 and 8 are two parts of the casting; 9 and 10 are the surfaces to be joined; 11 and 12 are two concave spaces facing one another against the joint, which is made previously in center of the surfaces to be joined 9 and 10 at the time of casting; 13 and 14 are soldering alloy (soft solder) which fill in the concave spaces coating the surfaces to be joined 9 and 10 respectively.

In this example, the concave spaces 11 and 12 being filled with soldering alloy (soft solder), soldering operation can be done more completely and solidly. Besides, when the soldering alloy is poured into the joint, since it flows into the concave spaces 11 and 12, there is practically no overflow of the soldering alloy (which hinders alumite coating of the material) on the outer circumference of the parts to be joined 9 and 10. This makes soldering and also alumite coating extremely easy.

It is to be noted that the present invention is not to be confused with the prior art which consists only in coating and soldering of the two surfaces to be joined by means of a soldering alloy, the chief drawback of which is the formation of an oxide film on the outer circumference surface, which prevents a solid soldering of the material. In the present invention, the oxide film formed by the first coat of soldering alloy on both surfaces of the material is destroyed by the new soldering alloy poured into the joint; in this way the soldering alloy on both surfaces are melted together completely so as to produce a satisfactory joint. Moreover, the soldering alloy used for this pouring is of a low diffusion ratio, the strength of soldering alloy itself attaining to 100%, the strength of the soldered part is also very high.

Said soldering alloy is composed of Al, Cu and Zn and impurities are below 0.06%. The tensile strength is 30 kg./mm.$^2$. Hence, in case when 100% efficiency is attained, the tensile strength of the soldered part will be more than three times that of a pure aluminum.

Although the present invention has been described in conjunction with preferred embodiments, it is to be understood that the present embodiments be considered in all respects as illustrative and not restrictive, reference being had to the appended claim rather than to foregoing description to indicate the scope of the invention.

What is claimed is:

The process of forming a composite structure by joining cast workpieces made of aluminum, comprising the steps of; casting separate workpieces which when joined along particular faces of the workpieces will form the desired structure, each face of the pair of faces to be joined forming a recessed symmetrical geometrical figure complementing in geometry and symmetry the figure of the opposing face on the opposing workpiece to be joined; coating said faces with a melted soldering alloy composed of from about 4% to about 4.3% aluminum, from about 4.8% to about 5% copper, and the remainder zinc of a purity of 99.94% or over; aligning the workpieces with the respective pair of faces opposing each other; heating the workpieces; pouring said melted soldering alloy between the opposing faces so as to fill said recesses; allowing said structure to cool, and thus forming a composite structure.

References Cited in the file of this patent

UNITED STATES PATENTS

| | | |
|---|---|---|
| 920,743 | Hines | May 4, 1909 |
| 2,354,006 | Gauthier | July 18, 1944 |
| 2,383,511 | Reynolds | Aug. 28, 1945 |
| 2,569,956 | Schiltknecht | Oct. 2, 1951 |
| 2,746,106 | Myers | May 22, 1956 |
| 2,779,999 | Boam | Feb. 5, 1957 |
| 2,790,656 | Cook | Apr. 30, 1957 |
| 2,791,557 | Makay | May 7, 1957 |
| 2,842,818 | Cocks | July 15, 1958 |
| 2,849,790 | Zwicker | Sept. 2, 1958 |